Patented Feb. 20, 1951

2,542,043

UNITED STATES PATENT OFFICE 2,542,043

METHOD OF PRODUCING A CORROSION RESISTANT COATING ON STEEL

Glenn H. McIntyre, Cleveland Heights, Ohio, and Millard G. Ammon, Nashville, Tenn.

No Drawing. Application September 6, 1947, Serial No. 772,594

2 Claims. (Cl. 148—6.35)

This invention relates as indicated to methods of producing corrosion resistant coatings, and more particularly to producing coatings for metallic articles which may be applied at elevated temperatures on the order of from 1500° F. to 1700° F.

It is a principal object of our invention to provide a method of producing a coating, characterized by the fact that the coating is extremely thin, very resistant to corrosion, while at the same time very tenaciously adherent to the underlying metallic article which may be formed of sheet steel.

Other objects of our invention will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, this invention comprises the discovery that very tenaciously adherent corrosion resistant coatings may be provided on metallic articles, such as those made from sheet steel, by the application thereto of a porcelain enamel sheet steel ground coat which is applied much thinner than its normal weight of application when used as a ground coat, and which, during the fusing state is very substantially overfired so that the metallic oxides formed on the metallic surface during the initial stages of the firing operation are completely absorbed or dissolved by the coating which, in its final state, is preponderantly a layer of such oxides cemented to the metallic surface by the residuum of the glass present in the enamel as applied.

The coating thus produced may be described, as indicated, as a cemented metallic oxide coating which because of this character of its composition is extremely resistant to corrosion.

We are aware of the fact that there have been attempts in the prior art to produce coatings of this character. These have relied, however, on the inclusion in the enamel as applied of very substantial amounts of metallic oxides, with the expectation that the glassy components of the mixture as applied would serve to cement the metallic oxides as a film onto the metallic surfaces to be protected.

These prior art efforts have been generally unsatisfactory for various reasons, among which have been included high cost, the undesirable thickness of the coating necessary to provide sufficient protection, and many times, as a result of the latter, very poor bond between the coating and the metallic surface. These prior art efforts have generally employed materials commonly known in the art as porcelain enamel cast iron ground coats for the reason that porcelain enamel ground coats as normally applied to cast iron are generally loaded with very substantial amounts of relatively infusible materials such as silica and feldspar. Chromium oxide has also been used in very substantial quantities in prior art compositions with the undesirable results as above pointed out.

In contradistinction to these prior art attempts, we use coating compositions which, in the art, are generally known as porcelain enamel sheet steel ground coats. This class of ground coat enamels is characterized by the fact that they, as applied, consist substantially entirely of glass and are fired at a temperature, and under such conditions, that the components of the coating are substantially all completely fused. This is in contradistinction to the cast iron ground coat materials which, containing substantial quantities of raw materials such as feldspar, silica sand, and the like, are not reduced to a fused state.

As an indication of the type of porcelain enamel sheet steel ground coats which may be used in carrying out our invention, reference may be had to the following table wherein will be found two specific examples and a range of representative compositions.

Table A

|  | Parts By Weight | | |
| --- | --- | --- | --- |
|  | Example 1 | Example 2 | Range |
| Silica Sand | 836 | 560 | 450 to 1,000 |
| Dehydrated Borax | 634 | 634 | 500 to 850 |
| Feldspar | 760 | 800 | 650 to 850 |
| Soda Ash | 206 | 262 | 150 to 400 |
| Sodium Nitrate | 138 | 120 | 100 to 200 |
| Fluorspar | 138 | 400 | 100 to 500 |
| Cobalt Oxide | 16 | 17 | up to 50 |
| Manganese Oxide | 34 | 34 | up to 50 |
| Black Nickel Oxide | 20 | 17 | up to 50 |
| Bone Ash |  |  | up to 50 |

The materials given in the foregoing table are the raw batch composition. They, after being thoroughly mixed, may be smelted at about 2400° F., after which they are fritted by being run into a water bath. The enamel slip for application to the work, as by brushing, spraying, or dipping, may then be prepared by grinding in a ball mill with 100 parts of the glass, about 7 parts of clay, and about ¾ part borax. The grinding is continued to a fineness such that from 5 to 6 grams will remain on a 200 mesh screen from a 50 cc. liquid sample. The slip thus prepared will be deposited on the work to a weight of about $\frac{1}{12}$ to ¼ oz. per square foot dry weight, preferably about 1/7 oz. per square foot dry weight.

The enamel of Example 1 in Table A will provide a relatively hard glass, i. e. it will have a somewhat higher firing temperature than the softer glass of Example 2. They will, however, usually fire out satisfactorily when used as a normal ground coat on sheet steel of about 20 gauge, at a temperature of about 1560 to 1580° F. in a period of from 3 to 5 minutes. We might say that when used as a normal ground coat, these enamels would be applied in weights of from 1¼ to 1¾ oz. per square foot dry weight as compared with the preferred weights of application given above when practicing our improved process.

After the ground coat has been applied it will be fired at a temperature of from about 1500° F. to about 1700° F. and preferably of from 1580 to 1600° F., i. e. slightly higher than the temperature at which it would be fired for normal ground coat use. The enamel will be fired preferably for a period of from 5 to 8 minutes, depending upon the character of the enamel and the nature of the workpiece, this it will be observed being approximately twice as long as the normal firing time as indicated above for normal ground coat use.

Stated in another way, coatings when applied in accordance with our invention will be fired at a temperature of about 50–100° F. above the normal maturing temperature of the coating and for a period of time approximately twice as long as the normal firing time of the coating when used as a ground coat. When applying the coating to articles of different thickness, some allowance should be made for the thickness or weight of the base metal, as, for example, when applying the coating to a thin steel sheet the firing time need not be quite as long as when it is applied, for example, to a steel article of ½ inch thickness. The optimum firing conditions for the coating may be expressed as those conditions substantially equivalent to those secured by firing a 20 gauge steel sheet for about 5–8 minutes at temperatures between 1500 and 1700° F.

The enamel is applied, of course, in its wet state. After drying, and during the initial stages of the firing operation, a certain amount of iron oxide is formed on the sheet steel surface being coated. The increase in firing time and temperature is for a two-fold purpose: First, for the purpose of developing the maximum amount of the oxide coating on the work; and second, and of greatest importance, to completely dissolve or combine the metallic oxide coating with the glass of the applied coating, and to simultaneously fire down the glass to the point where it is completely devitrified, and only just enough remains to serve as the medium to bond the iron oxide coating thus formed into a thin tenaciously adherent coating.

It is a characteristic of the coating that its color is characteristic of the color of an oxide of the base metal to which it is applied. Thus, when applying the coating onto a steel sheet it will be a reddish brown color characteristic of the oxides of iron.

A coating produced in this way is much superior to those produced in accordance with prior art efforts as above pointed out, for the reason that forming the metallic oxide coating in situ on the work, simultaneously with the inter-fusion therewith of the glass, results in a coating which is much more strongly adherent than those heretofore produced. The relatively thin weight of application of the glass leaves just enough glass as a residue to serve as the binder so that the corrosion-resistant coating is provided in the main by the metallic oxides thus formed.

While, in accordance with the preferred embodiment of our invention, the iron oxide for the coating may thus be provided entirely by an oxidation of the metallic surface, it is nevertheless possible to admix some iron oxide with the ground coat as applied, provided not too much is thus added, since any increase in the amount of iron oxide present, which is due to the addition of iron oxide to the coating, measurably decreases the adherence of the resultant film.

Other modes of applying the principle of the invention may be employed, change being made as regards the details described, provided the features stated in any of the following claims, or the equivalent of such, be employed.

We therefore particularly point out and distinctly claim as our invention:

1. The method of coating a steel article which comprises applying on such article a layer of from about $\frac{1}{12}$ to about ¼ ounce per square foot dry weight, of a feldspar-silica-borax containing porcelain enamel sheet steel ground coat which when applied at a dry weight of 1¼ to 1¾ ounces per square foot would fuse to a glassy surface when fired for about 3 to 5 minutes at a temperature of from about 1560° F. to about 1580° F., firing the coated article at from about 5 to 8 minutes at from about 1500° to about 1700° F. to first form iron oxides on the metal surface and then to absorb such oxides into the enamel coat to produce a substantially completely devitrified coating, said coating being characterized by its extreme thinness, high resistance to corrosion and tenacious adherence to the metal article.

2. The method of coating a steel article which comprises applying on such article a layer of such thickness that the solid content thereof will weight from $\frac{1}{12}$ to ¼ ounce per square foot, the solid components of which are substantially entirely glass which when applied at a dry weight of 1¼ to 1¾ ounces per square foot would fuse to a glassy surface when fired for 3 to 5 minutes at a temperature of from about 1560° F. to about 1580° F., firing the coated article at from about 5 to 8 minutes at from about 1500° to about 1700° F. to form first iron oxides on the metal surface and then substantially to devitrify completely said glass components, said coating being characterized by its extreme thinness, high resistance to corrosion and tenacious adherence to the metal article.

GLENN H. McINTYRE.
MILLARD G. AMMON.

REFERENCES CITED

The following references are of record in the file of this patent:

UNITED STATES PATENTS

| Number | Name | Date |
|---|---|---|
| 1,924,311 | Frey | Apr. 29, 1933 |
| 1,982,179 | Scharschu | Nov. 27, 1934 |
| 2,070,368 | Martin | Feb. 9, 1937 |
| 2,394,047 | Elsey et al. | Feb. 5, 1946 |

FOREIGN PATENTS

| Number | Country | Date |
|---|---|---|
| 455,951 | Great Britain | Oct. 30, 1936 |